MAGNETIC CORE SHIFT REGISTER

Filed Jan. 28, 1955

INVENTORS
WILMUR M. MCMILLAN
RICHARD W. LOWRIE

BY

Ralph L. Thomas

ATTORNEY

United States Patent Office 2,846,669

Patented Aug. 5, 1958

2,846,669

MAGNETIC CORE SHIFT REGISTER

Wilmur M. McMillan, Wappingers Falls, and Richard W. Lowrie, Poughkeepsie, N. Y., assignors to International Business Machines Corporation, New York, N. Y., a corporation of New York Application January 28, 1955, Serial No. 484,677

5 Claims. (Cl. 340—174)

The present invention relates in general to a magnetic core shift register and in particular to a magnetic core shift register for supplying increased voltage to a load device.

In previously known forms of magnetic core shift registers, the output voltage from an individual stage was insufficient to drive certain external load devices. Separate voltage amplifying equipment was employed between the output of an individual stage of the prior magnetic core shift register and the load device. By the novel arrangement of the present invention the separate voltage amplifying equipment is eliminated thereby providing greater efficiency and more economy as well as reduction in weight and size of the equipment.

The magnetic core shift register employed in the present invention has a plurality of magnetic cores, each of which has a shift winding, an input winding and two output windings. The cores, magnetizable to either of two stable states, have remanent flux either clockwise or counterclockwise within the cores. Ordinarily, the value of remanent flux in either direction, referred to as retentivity, substantially is the same. Remanent flux is established in one direction to represent a binary one and in the opposite direction to represent a binary zero. For the purposes of the present invention, a current pulse applied to a shift winding changes the core if in the One state to the Zero state; whereas a current pulse through the input winding, if sufficient in magnitude, changes the core if in the Zero state to the One state. The magnetic state of a core is transferred to the succeeding core by a transfer circuit which is energized when a core changes its magnetic state from One to Zero in response to a shift pulse. If a core is in the One state when a shift pulse is applied, one of the output windings serves to energize the transfer circuit which establishes the One state in the succeeding magnetic core; the voltage from the other output winding is additively combined with the voltage from the first output winding; and the resulting voltage energizes a load device. The voltage from either output winding taken individually is insufficient to provide the necessary operating potential for the load device, but together they constitute a pulse of sufficient voltage and power for operational purposes.

Accordingly, an object of the present invention is to provide an improved magnetic core shift register.

Another object of the present invention is to provide an improved magnetic core shift register having a relatively large output voltage without exceeding diode back voltage limitations.

A still further object of the present invention is to increase the reliability, reduce the weight and size of equipment, enhance the efficiency and provide a more economical apparatus.

Other objects of the invention will be pointed out in the following description and claims and illustrated in the accompanying drawings, which disclose, by way of example, the principle of the invention and the best mode which has been contemplated of applying that principle.

Figures 1, 2:
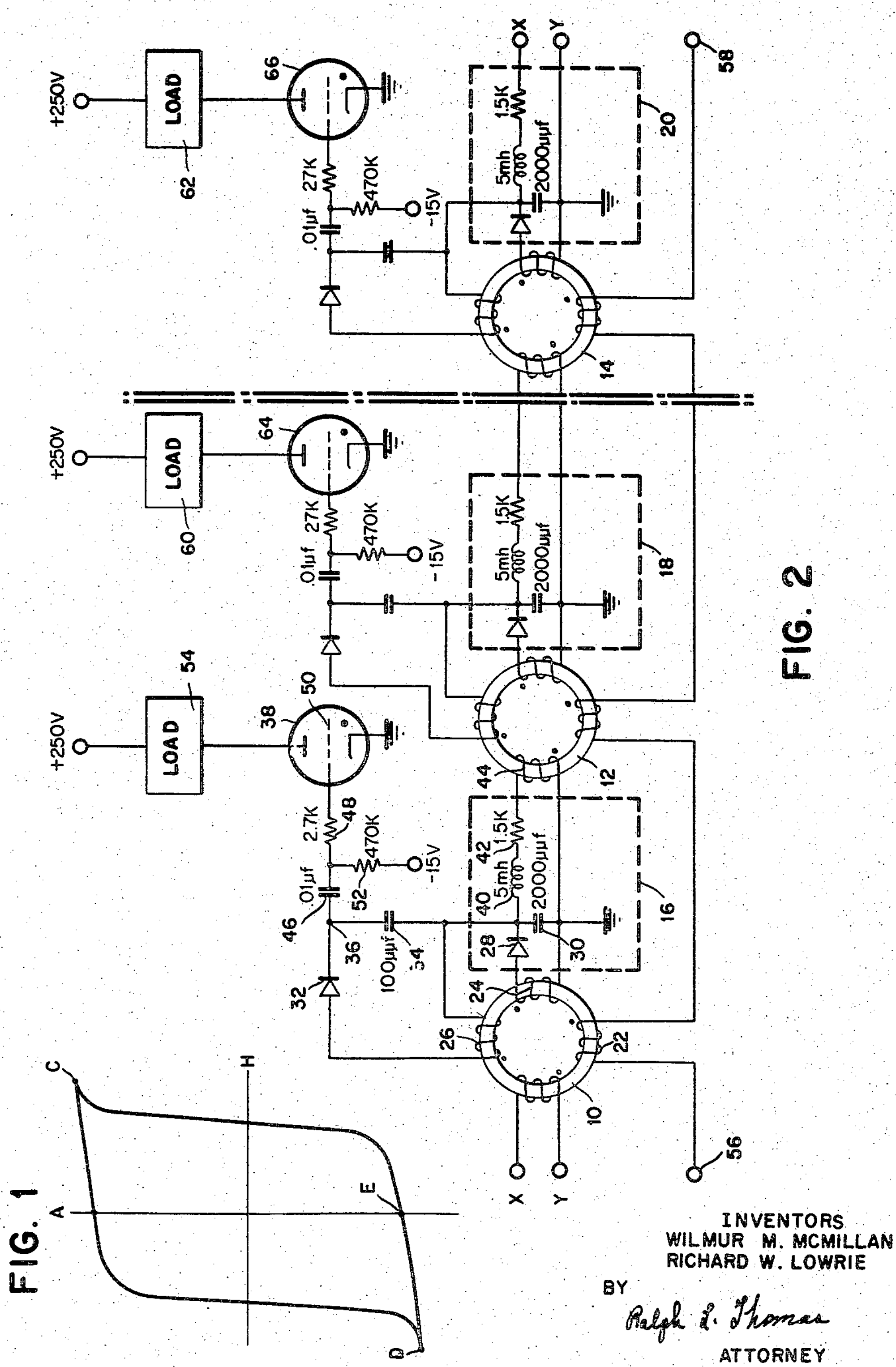
Fig. 1 is a curve illustrating the preferred hysteresis loop of the magnetic cores involved.
Fig. 2 is an illustration of the magnetic core shift register embodying the novel arrangement of the present invention.

The curve in Fig. 1 illustrates an idealized hysteresis loop of commercially obtainable magnetic material. Points A and E are stable remanent states further adapted for representing binary information, and a core may be driven to either of these states by the application of a positive or negative magnetomotive force respectively. If the state of remanence of a core of such material is that indicated by the point A, application of a positive magnetomotive force greater than the coercive force causes it to traverse the hysteresis curve to point C and, upon relaxation of this positive force, revert to point A. Application of a negative magnetomotive force greater than the coercive force causes the curve to be traversed to point D, and when the force is terminated, traversed to point E. Similarly, when the remanence state of the core stands at point E, the application of a negative magnetomotive force causes the curve to be traversed to point D and returned to point E when the negative force is relaxed; while a positive force greater than the coercive force causes the traversal of the curve from point E to point C and return to point A when the positive force is terminated. In order to indicate how the turns of a winding are placed on a core, the dot convention is employed to represent that a positive voltage exists at the dotted end of a winding whenever a shift winding is pulsed.

Reference is made to Fig. 2 for a description of the magnetic core shift register constructed according to the principles of the present invention. As shown, the magnetic core shift register includes magnetic cores 10, 12 and 14 interconnected by transfer circuits 16, 18 and 20. With the state of remanence indicated at point A on the curve in Fig. 1 arbitrarily selected as representing a binary one and the state of remanence indicated at point E as a binary zero, application of a negative magnetomotive force, by pulsing a shift winding 22 on the magnetic core 10, simultaneously causes a voltage to be induced on output windings 24 and 26 if the core previously was in the One state; while a negligible voltage is induced in these output windings if the core was in the Zero state. If the core 10 is in the One state when a negative magnetomotive force is applied, the resulting voltage induced on the winding 24 establishes current flow through a diode 28 to charge a condenser 30 of the delay network 16; simultaneously the voltage on the output winding 26 establishes current flow through a diode 32 to charge a condenser 34. The resulting voltage at point 36 is equal to the sum of the voltages across the condensers 30 and 34 since the windings 24 and 26 have like polarities. Furthermore, the voltage at point 36 is sufficient in magnitude to fire thyratron 38, and no further amplification is required of the voltage at this point. As soon as the shift pulse terminates, a charge on the upper plate of the condenser 30 discharges through a coil 40, a resistor 42 and an input winding 44 to ground. The positive magnetomotive force established on the core 12 by the discharge current through the winding 44 changes the magnetic state of this core from that indicated at point E on the curve in Fig. 1 to that state indicated at the point A. Thus the binary one previously stored in the core 10 is transferred to the core 12 in response to the first shift pulse. The voltage at point 36 is coupled through condenser 46 and the resistor 48 to a control grid 50 of the thyratron 38. Since the control grid 50 is biased by a source of negative 15 volts, connected through a resistor 52 and the resistor 48 to the grid, the voltage at point 36 must be sufficiently positive to overcome the negative 15 volt bias source. Once the potential of the control grid 50 rises positively to the ignition potential, the thyratron 38 is ignited and a load device 54 is energized. The grid circuit of the thyratron 38 represents a load circuit to be driven by the core 10; while the load device 54 is driven by a positive 250 volts source when the thyratron 38 is ignited.

The high value of resistance of resistor 52 serves to prevent the rapid discharge of the condenser 34 and to prevent overloading of the core 10 by presenting a high grid circuit impedance. All cores are tape cores having 5/16 inch inside diameter constructed of 4–79 Mo-Permalloy tape. The shift windings are fifty turns, and the remaining windings are one hundred turns of size 38 Formex wire.

It is seen therefore that a shift pulse applied to the winding 22 when core 10 of the first stage of the magnetic core shift register is in the One state causes (1) the One state to be transferred to the core 12 in the second stage and (2) the thyratron 38 to be fired and the load 54 to be energized. Successive shift pulses cause the same operations to occur in succeeding stages which are identical in construction to the first stage. If terminals labeled X and Y in the right most stage are connected to terminals X and Y in the left most stage, a One in any of the cores 10, 12 or 14 is cyclically shifted through the magnetic core shift register in response to shift pulses applied across terminals 56 and 58 by any conventional pulse generator device, not shown. Load devices 54, 60 and 62 are likewise successively energized as the binary one state is progressively shifted from core to core through the magnetic core shift register the first time around. If the thyratrons 38, 64 and 66 are quenched by conventional circuits, not shown, before their associated cores supply another voltage pulse sufficient to overcome the negative bias source on the associated control grids, they may be successively fired again whenever the one state is progressively shifted through the magnetic core shift register a second and subsequent times. The load devices 54, 60 and 62 may be any type of electrical circuits including, for example, other types of magnetic core circuits such as magnetic core registers which are to be sequentially interrogated.

It will be seen that by the novel arrangement of this invention there is provided an efficient and reliable magnetic core shift register device for supplying pulses at a sufficient magnitude without further amplification for firing a thyratron switching device. The desirable result of securing additional voltage for operational purposes is obtained with one additional output winding, a storage device and a diode for each stage. Hence the additional components are few in number, economical and easy to manufacture.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A magnetic core circuit comprising a magnetic element of substantial magnetic retentivity having at least two output windings thereon, a unilateral conducting device and a storage device for each output winding of said magnetic element, said unilateral conducting device and said storage device being serially connected across its associated output winding and means interconnecting said storage devices to produce a resultant signal voltage equal to the sum of the signal voltages across said storage devices.

2. A magnetic system comprising a plurality of stages, each stage including a magnetic core of substantial magnetic retentivity having an input winding, a shift winding, a plurality of output windings, an associated load device and transfer means, said transfer means in each stage interconnecting one of said plurality of output windings of said core in that stage with said input windings of the core of the succeeding stage, said transfer means including a first unidirectional impedance element and a first storage device, coupling means interconnecting another of said plurality of output windings of each of said magnetic cores to its associated load device, said coupling means including a second unidirectional impedance element and a second storage device, means serially connecting said first and second storage devices of each stage whereby an output potential equal to the sum of the individual output potentials of said storage devices is supplied to their associated load device.

3. A magnetic system comprising a plurality of stages, each stage including a magnetic core of substantial magnetic retentivity having an input winding, a shift winding and a plurality of output windings and further including an associated output device, transfer means interconnecting one of said plurality of output windings of each of said cores to said input winding of the core of the succeeding stage, said transfer means including a unidirectional impedance element and a storage device, coupling means interconnetcing another of said plurality of output windings of each of said magnetic cores to its associated output device, said coupling means including a unidirectional impedance element and a storage device, means serially connecting said storage devices of each stage whereby an output potential equal to the sum of the individual output potentials of said storage devices is supplied to their associated output devices.

4. A magnetic circuit comprising a first magnetic core, a second magnetic core, said magnetic cores having substantial magnetic retentivity, means for energizing said first magnetic core to cause the magnetic material to assume a first predetermined state of remanent magnetization, means for energizing said first magnetic core to cause the magnetic material to assume a second predetermined state of remanent magnetization, a first output winding and a second output winding on said first magnetic core, a first unidirectional current conducting device connected to said first output winding, a second unidirectional current conducting device connected to said second output winding, and means responsive to current flow through said first unidirectional current conducting device for energizing said second core to assume a predetermined state of remanent magnetization and responsive to current flow through said first unidirectional current conducting device and said second unidirectional conducting device for energizing a load device.

5. A magnetic core shift register comprising at least two stages; each stage having a magnetic element of substantial magnetic retentivity and a transfer circuit; each magnetic element having an input winding, a shift winding, a first output winding and a second output winding positioned thereon; said transfer circuit in each stage being coupled between said first output winding of that stage and said input winding of the next succeeding stage; means coupled to said shift winding in each stage for simultaneously causing the residual magnetism in all magnetic elements to assume a first predetermined flux direction; each of said transfer circuits including a unilateral conducting device and a storage device connected in series across the associated first output winding, said transfer circuits permitting the passage of electrical current from said first output windings to said input windings only in response to a change in magnetic flux from a second predetermined flux direction to said first predetermined flux direction within the magnetic element of said output windings; each of said second output windings in each stage having a unilateral conducting device and a storage device serially connected thereacross, means connecting said storage devices associated with said first and second output windings in an additive relationship, whereby a voltage equal to the sum of the voltages across said storage devices in each stage is developed in response to a change in magnetic flux direction within the associated magnetic element from said second predetermined flux direction to said first predetermined flux direction.

References Cited in the file of this patent

UNITED STATES PATENTS

| | | |
|---|---|---|
| 2,673,337 | Avery | Mar. 23, 1954 |
| 2,719,773 | Karnaugh | Oct. 4, 1955 |
| 2,719,961 | Karnaugh | Oct. 4, 1955 |